Dec. 14, 1926.                                                     1,610,448
F. HUNZIKER
BRAKE FOR HOISTS, RAILWAYS, AND SO ON
Filed August 29, 1921       5 Sheets-Sheet 1
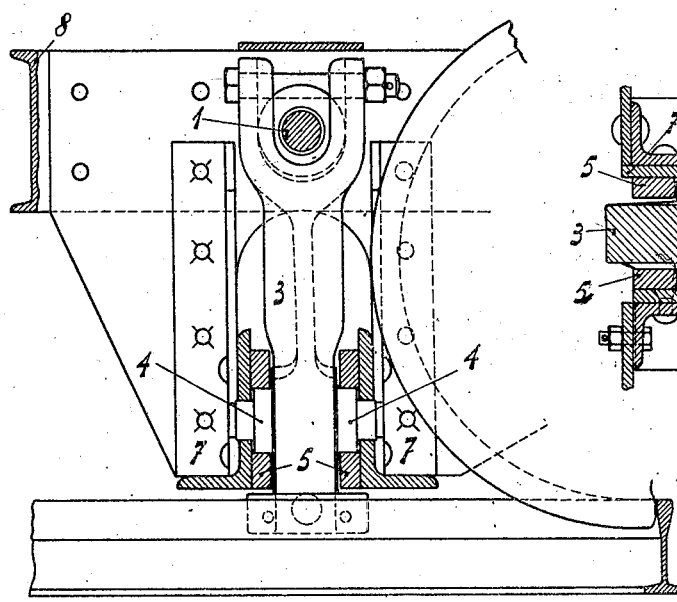
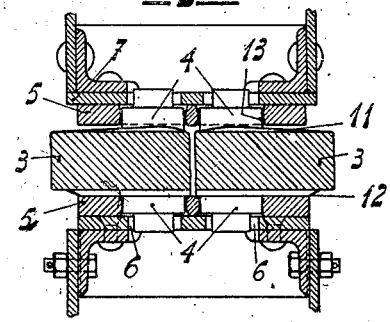
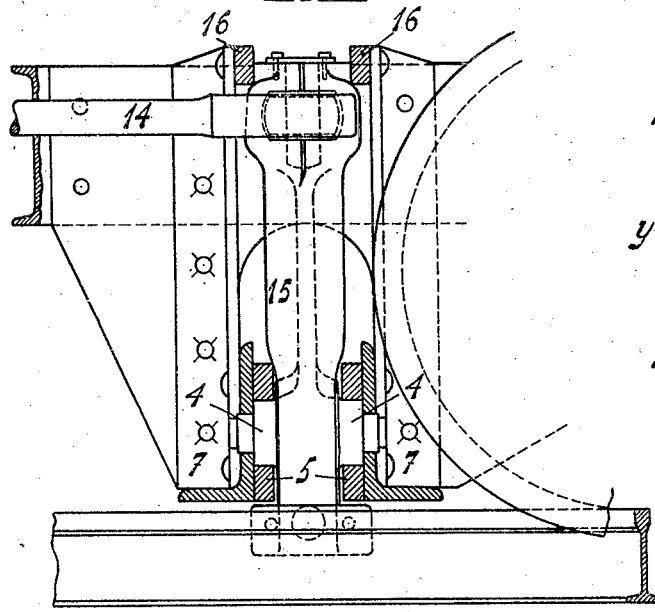
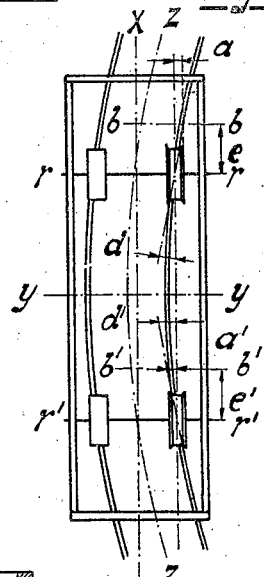

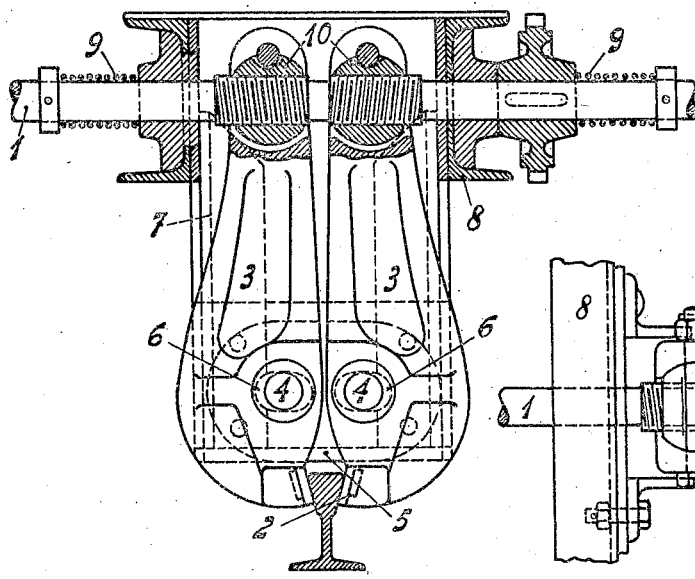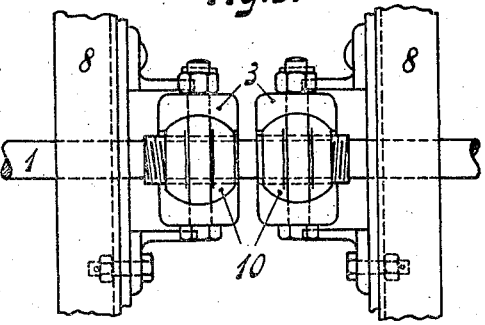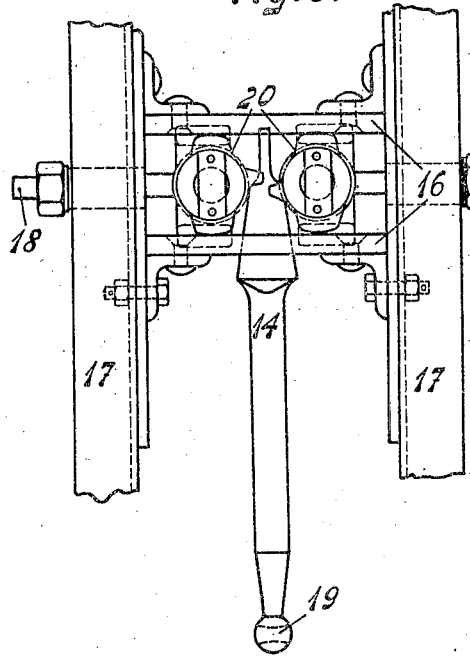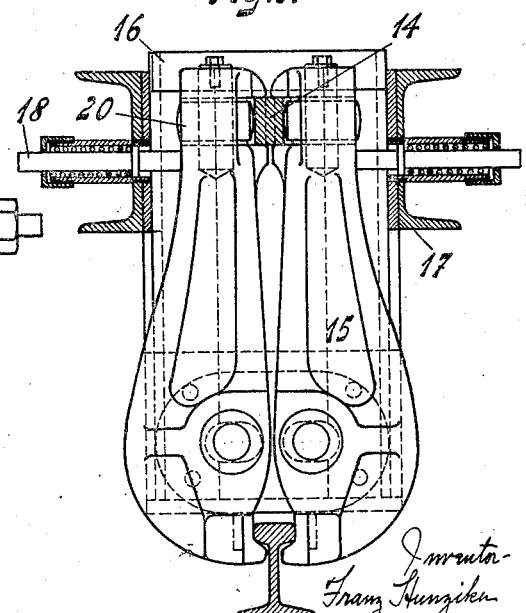

Dec. 14, 1926.  
F. HUNZIKER  
1,610,448  
BRAKE FOR HOISTS, RAILWAYS, AND SO ON  
Filed August 29, 1921    5 Sheets-Sheet 3
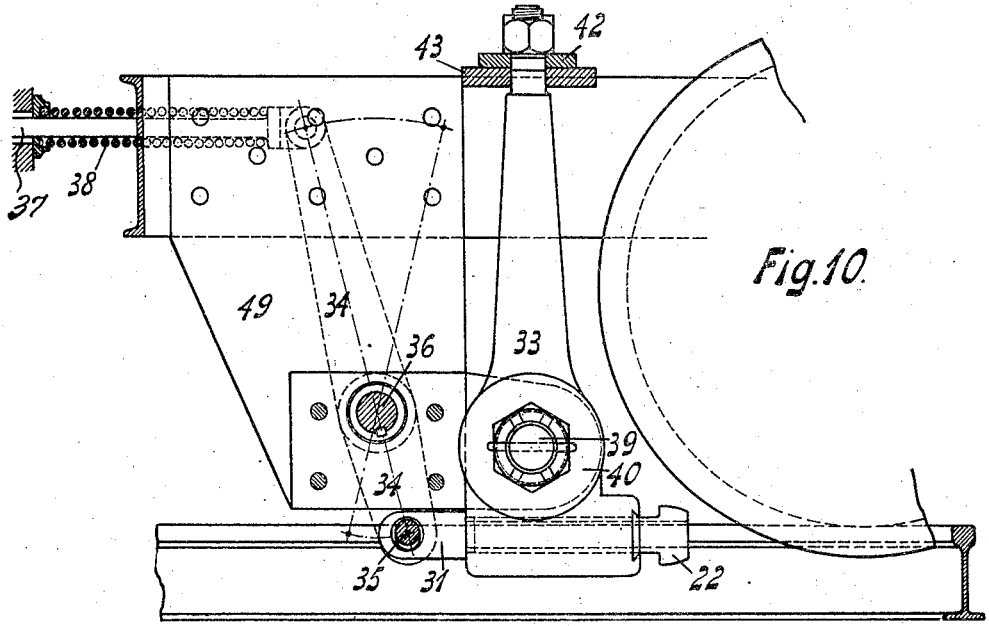
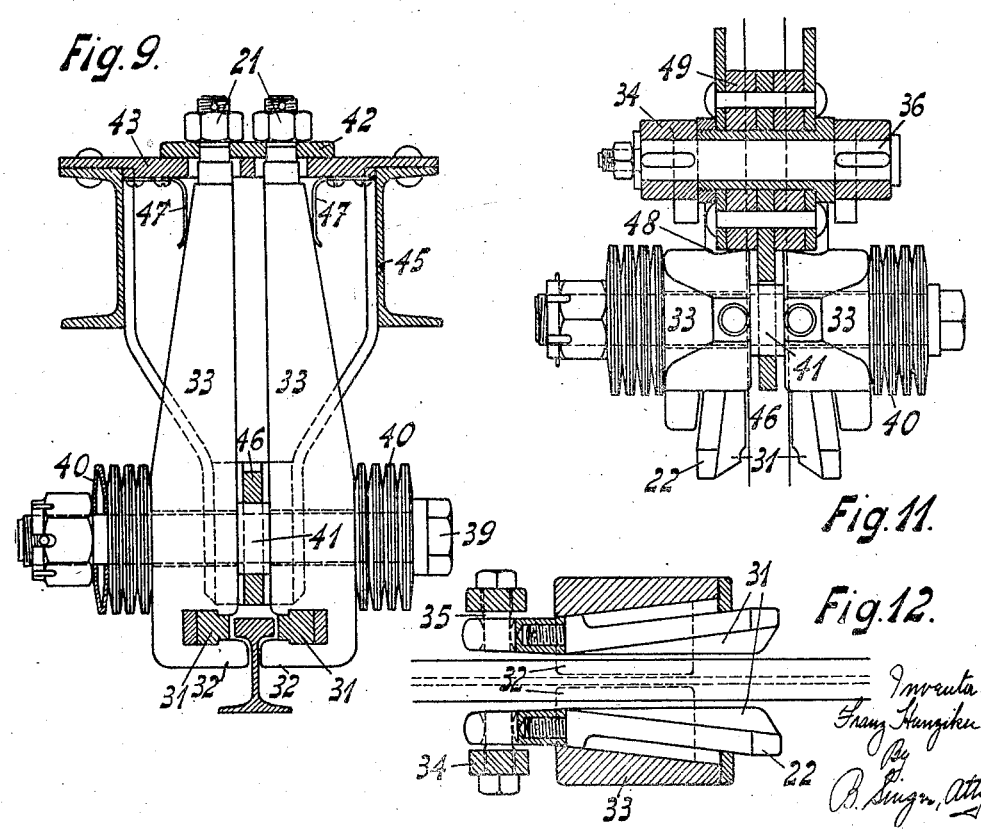

Dec. 14, 1926.　　　　　　　　　　　　　　　　　　　　1,610,448
F. HUNZIKER
BRAKE FOR HOISTS, RAILWAYS, AND SO ON
Filed August 29, 1921　　　5 Sheets-Sheet 4
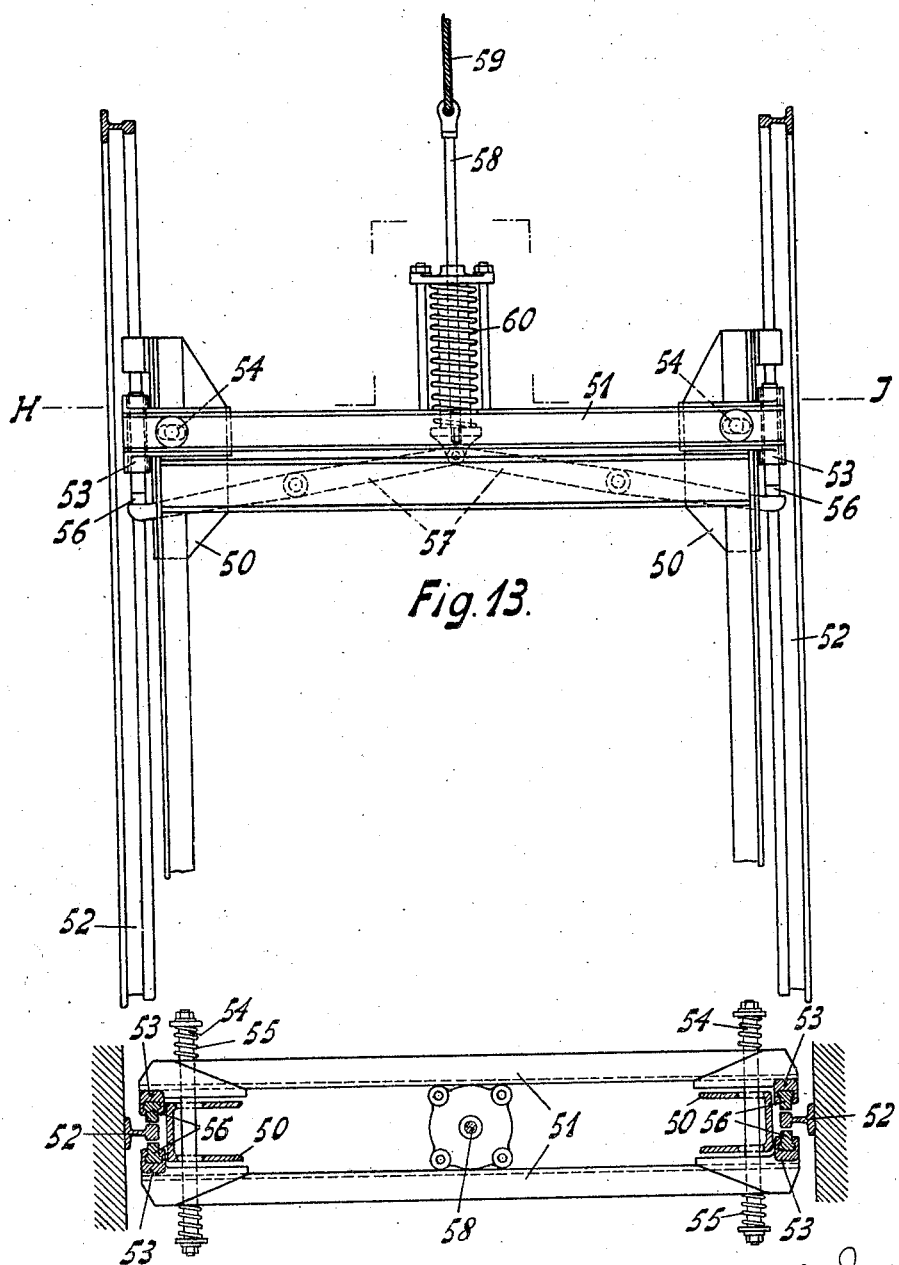

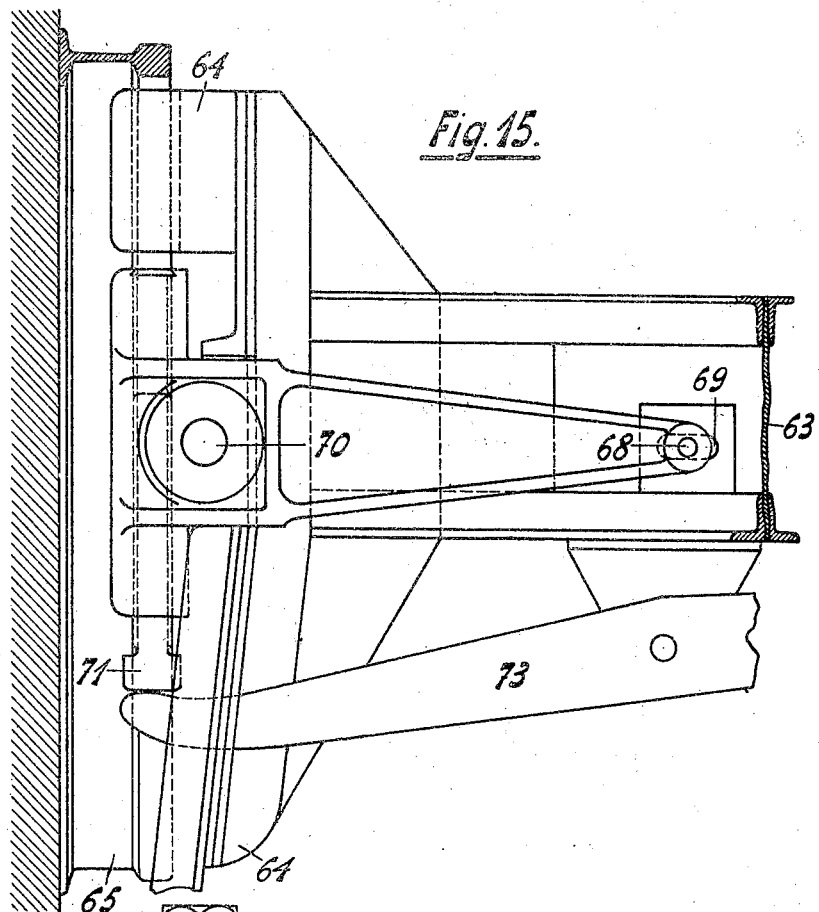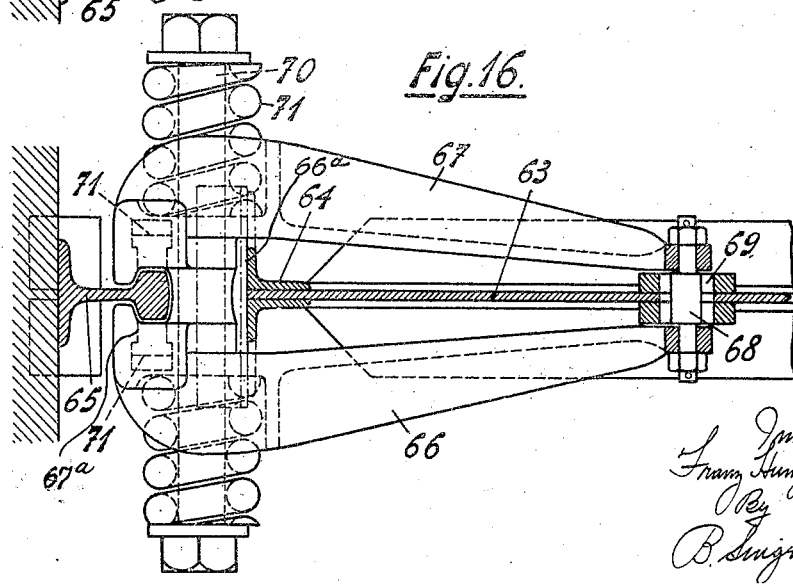

Patented Dec. 14, 1926.

1,610,448

UNITED STATES PATENT OFFICE.

FRANZ HUNZIKER, OF LUCERNE, SWITZERLAND.

BRAKE FOR HOISTS, RAILWAYS, AND SO ON.

Application filed August 29, 1921, Serial No. 496,389, and in Germany June 5, 1920.

The present invention relates to an improvement in the method of attachment and of setting into motion of brakes which operate on the rail by the friction of their surfaces on each side of the rail, in the manner of similar brakes used especially for lifts, aerial rope-ways, and cable-railways.

The object of the invention is to obviate on the one hand, the short comings attached to similar existing brakes and on the other hand to provide a construction of new forms of brakes which offer great advantages compared with those now in use.

In accordance with the present invention the brake is attached to the vehicle in such a manner, that it is able to move freely, as far as is necessary, tranversely, and also as a whole or in parts to turn vertically to the plane of the track, so that the contact surfaces of the brake can freely and without any interference lay themselves against the friction surfaces of the rails. In this manner, on the brake being applied, the whole contact surfaces of the brake will always be in operation and it will wear very little and evenly. The faces of the brake gripping the rail may be very near the faces of the rail co-operating therewith the brake therefore can close rapidly and instantaneous braking action is effected. All prejudicial effects, like jamming, additional strains of the individual brake parts large power requirements, unreliable and faulty action of the brake, etc., are prevented. In the drawings some devices are shown diagrammatically.

Fig. 1 is a diagrammatic plan of a railway car provided with my improved brake.

Figure 2 illustrates a clutch-brake for wedge-head rails attached and actuated in accordance with the invention as seen from the side, and Fig. 3 illustrates its frontview, part of it in section. Fig. 4 is a horizontal cross-section through the joints of the clutch, and Fig. 5 shows spindle and nuts from above. Figs. 6, 7 and 8 illustrate a different form of clutch-brake, Fig. 6 being the side view, partly drawn in section, Fig 7 is a cross section and Fig. 8 illustrates the view from above.

Figures 9 to 12 illustrate an example of adaptation of the new rapid-clutching-brake.

Fig. 9 illustrates the front view of the rapid-clutch brake.

Fig. 10 shows its side view.

Fig. 11 illustrates the view from above with section of part.

Fig. 12 is the horizontal section through the proper brake-parts.

Fig. 13 shows the top of a car of a lift with the brake. Fig. 14 is a top view thereof.

Fig. 15 is a vertical sectional view of a modified form of the invention.

Fig. 16 is a horizontal sectional view of the same.

In a frame 8 of the chassis of a railway carriage a spindle 1 is rotatably mounted having right-handed and left-handed screw threads adapted to swing friction gripping arms 3 on their pivots 4. The spindle 1 (Figs. 1 to 5) presses the brake-jaws 2 situated at the bottom end of the brake in the well known operation against the rails from both sides, when the upper ends of the brakes are forced apart by the right-handed and left-handed threads of the spindle 1. The lower part of the friction gripping arm is constructed in a similar manner to the ordinary brake gripping arms. The two arms 3 are provided directly above the level of the rail-head with joint pins 4 and they are connected with each other in the manner of shears by means of two fish-plates 5. Outside of the fish-plates 5 the two pins 4 fit into elongated holes 6 of the shields 7 of the vehicle-frame 8, thus forming the lower horizontally sliding seats of the gripping arms 3.

The brake-spindle 1 is arranged to slide axially in the frame of the vehicle 8, and is retained in its mean position with the brake open, by springs 9. It therefore permits of a lateral sliding movement of the upper parts of the friction gripping arms as well. The nuts 10 are spherical and are mounted in corresponding recesses in the upper ends of the gripping arms and hence permit any desired sliding or turning movement of the two arms 3 without at any time interfering with the transmission of power between spindle and said arms 3. With this example of adaptation each individual arm can therefore turn. The ball joints 10 between spindle and arms may be replaced by other parts doing similar service. In order to enable the arms to turn their lower parts as well within the frame of the vehicle sufficient play has been allowed and they are resting on one side with arched surfaces 11 against the frame. On the other side the surfaces of the arms are level as at 12, to enable them to hang straight when the brake is opened. The holes 13 of the fish-plates 5 are rounded off for the brake-pins 4, so that they can alter their position to one another when the arms 3 are turning, without jamming.

In order to apply the brakes it is only necessary to rotate the spindle or shaft 1 by any suitable means, a gear 92 being shown in Figure 3 for this purpose, which in practice is engageable with a suitable chain or nut gear. The springs 9 permit necessary endwise movement of the shaft 1. The right and left-hand threads of the shaft by engagement with the spherical nuts must move the latter or from each other, according to the direction in which the shaft is turned and such movement of the nuts is communicated to the upper ends of the brake arms or levers 3, said levers being caused to turn all their pivots 4 and to also turn with respect to the spherical nuts 10 as may be required by a curve in the track so that the brake shoes 2 will always be maintained parallel with the chord of the track if the same be curved. The slots 6 of the shields 7 permit angular movement of the pivots or joint pins 4 as will be understood.

In the construction shown in Figs. 6 to 8 other means to actuate the brake are shown. The upper end of the arms are forced apart by a wedge 14. The arms 15 together with the wedge drive can be moved freely laterally, and the clutch arms 15 can turn freely. The latter are carried at their upper end by two guide rails 16 so that they can slide transversely in the frame of the vehicle 17, and when the brake is open, they are held in their mean position by spring-pins 18. The wedge 14, being on the one end connected with its drive (not shown in the drawing) by means of a ball-joint 19, is carried at the other end by two arms 15 between two pressure rollers 20, so that it can move freely. The rollers 20 are rotatably mounted on the arms 15. The lower portion of the brake is also carried movably in the vehicle-frame and it is constructed similarly to the first example described (Figs. 2 to 5) with the sole difference that in place of the wedge-head-rail an ordinarily shaped rail has been drawn, such as are more easily obtainable anywhere and of all sizes.

In Figs. 9 to 12 a third example is shown. Two brake-wedges 31 with sliding-plates 22 are placed at the lower end of two brake-arms 33 at each side of the rail, free to slide in the direction of the rails, and they are actuated by the double-armed lever 34 with joint-pins 35, pin 36 throw-out-rods 37 and locking spring 38. The brake-arms 33 are held together above the rail by a connecting pin 39 with two strong brake-springs 40.

A distance-ring 41 ensures the proper distance betwen the two brake-arms when the brake is open, whereas a fish-plate 42 connects the upper ends of the brake-arms 33 at their proper distance. This fish-plate 42 with the brake-arms 33 is transversely movable on a girder 43 of the vehicle frame 45. The lower part of the brake is also movably held in a fish-plate 46 of the vehicle-frame. Two springs 47 maintain the open brake in its mean position whereas at the lower end it is guided along the rail. The two brake-arms 33 support themselves, together or singly turnable vertically to the track-plane, at one side against brake-shields 49 of the vehicle. Laths 32, at each side reaching underneath the rail head and the nuts 21 prevent the vehicle from leaving the rails when the brake is being applied. The joints 35 allow the brake free movement as against its rods 34 to 37.

This brake operates in the following manner:

When the brake is open the locking-spring 38 resting against the vehicle-frame 45, is in tension, and the rods 37 are kept in position by a throw-out device not shown in the drawing. When actuating the rods 37 the two brake wedges 31 are first of all thrown suddenly and forcibly in between the brake-arms by the force of the locking springs 38, until they rest against the rail-head freely and perfectly at each side, and owing to the fact that the brake-arms have their upper ends mounted for movement transversely of the frame and also mounted for pivotal movement, that the entire brake can adjust itself on the vehicle insuring the operation of brake whether the vehicle is on the straight track or on a bend. The vehicle continuing on the move now draws the brake-arms 33 over the two wedges 31 resting on the rail until the arms 33 forced apart by springs meet the prominences 22 of the wedge 31 carrying the latter along. The brake is now closed and it gradually brings the vehicle to a standstill owing to the sliding friction on the rail. The efficiency of the brake and the length of the run with the brake applied can be regulated by the more or less strong tension given to the brake-springs 40.

The efficiency of the brake is quite independent of the gradient, of the load carried and of the impulses of adhesion. For this reason it can be applied to lifts just as well. It is a fact that the work of the catch-brake-device attached rigidly to the lifts heretofore used, is affected unfavourably if the lift for example is loaded unevenly, thus pressing the catch-brake-device to one side. A fall-brake freely movable attached to a lift will lead here also to increased safety, and to more rapid and more even effect, and promote a more perfect pressure on the friction surface against the guide-rail, which will be of great advantage, espectially with the heavy mining-hoists. It is not necessary that the guide-rail should be a railroad rail with vertical lifts, it may be smooth and without a head, as has been the usual practise. In Figs. 13 and 14 one mode of constructing the brake in connection with lifts is shown.

On the frame 50 of an elevator car two horizontal bars 51 are movably mounted in horizontal direction, extending above or below the car or lift from one rail 52 to the other. They are fitted at each side with two brake-pieces 53 and they are interconnected by connecting-pins 54 and pressed against each other by springs 55 all made in such a manner that the bars would be attached to the lift moving horizontally and freely within certain limits. Two pairs of brake-wedges 56 are provided, the wedges resting on two double armed levers 57 hinged to a common vertical rod 58 fixed to a hoisting rope 59. A spring 60 abutting on a bearing of the car at the one end and on the rod 58 on the other end pushes the wedges 56 between the pieces 53 as soon as the rope 59 breaks, or if the car lowers swiftly with an excessive speed etc. The mechanism between the brake and the rope suspension can be constructed otherwise as shown, but always in such a manner, that each brake shoe can adjust itself freely in any direction independently of the others even after some wear etc.

In any of the constructions shown, the brake pieces cooperating with the rails may be made adjustable in a direction perpendicular to the running face of the rails. If for instance in the construction shown in Figs. 13, 14, the distance between two rails varies the brake pieces need have some play to adjust themselves with reference to each other. Care is to be taken that in any position each brake piece bears with its whole breaking surface on the rail co-operating therewith and that the distance between the co-operating friction faces is a minimum to ensure a rapid closing of the brake.

In the brakes used in connection with rail-carriages a brake piece bearing on the upper horizontal face may be used provided provision for adjustment in vertical direction is made to eliminate the effect of wear, of lowering of the axles of the vehicle, and so on.

A brake constructed according to this principle is shown in Figs. 15 and 16. On each end of a beam 63 of the cage, car, etc. a guide piece 64 is attached embracing the rail 65. Two levers 66, 67 are arranged in said guide piece pivoted on a bolt 68 passing through an elongated slot 69 of the web of the beam 63. The bolt 68 slides freely in said slot in such a manner that the free ends of the levers 66, 67 can follow the inequalities, the bends, etc. of the rail 65. Near the free ends of the levers 66, 67 they are traversed by a spindle 70 having a nut at each end and springs 71 between the nuts and the levers to press the levers 66, 67 against each other and on an abutment 66$^a$ of piece 64 in such a manner that they do not touch the rail 65. Each lever 66, 67 has near its free end a slot 67$^a$ running in the direction of the rail 65. In each slot a wedge 71 is slidably mounted resting on an arm 73 of a double armed lever pivoted on the beam 63 and actuated by some brake-gear which gear may be of any suitable construction. It is apparent that the braking surfaces of the levers 66, 67 follow closely the co-operating faces of the rail 65, the co-operating faces are near each other and a rapid gripping and a self-adjustment of the faces is attained.

I wish it clearly understood that various changes may be made without departing from the spirit of my invention, the principle as shown applied to lever-brakes may be applied to other brakes as well for instance to brakes having cams or some other braking organ. The essential feature is that the braking element co-operating with the rail has sufficient freedom to adjust itself to the deviations of the rail.

Having now described my invention what I claim by U. S. Letters Patent is:—

1. A rail brake comprising in combination, two gripping arms, pivots for said arms, bearings for said pivots, a screw-spindle with right hand and left hand threads, and nuts on said threaded portions of said spindle and mounted on said arms for universal angular movement, and means to rotate said spindle.

2. A rail brake comprising in combination two gripping arms, pivots for said arms, running substantially parallel to the rail, bearings for said pivots adapted to give said pivots play in a horizontal plane parallel to the top face of the rail and operating means actuating at the upper end of the arms and arranged to give each of the arms a universal angular independent movement.

In witness whereof I affix my signature.

FRANZ HUNZIKER.